United States Patent Office 3,080,416
Patented Mar. 5, 1963

3,080,416
PREPARATION OF ESTERS OF SUBSTITUTED ADIPIC ACIDS
Albert M. Durr, Jr., Ponca City, Okla., John E. Kircher, Houston, Tex., Charles E. Thompson, Ponca City, Okla., and Oscar L. Wright, McKees Rocks, Pa., assignors to Continental Oil Company, Ponca City, Okla., a corporation of Delaware
No Drawing. Filed Jan. 16, 1959, Ser. No. 787,137
4 Claims. (Cl. 260—485)

This invention relates to a new composition of matter. More particularly, this invention relates to esters of a mixture of homologous alkyl adipic acids and to a method of preparing said esters.

The new compositions of this invention have desirable characteristics which make them valuable in many industrial applications. They may, for example, be used as oil or grease lubricants for equipment operating over large ranges of temperature and pressure, as plasticizers in plastic compositions, films, filaments and the like, and as intermediates in the formation of various organic products such as condensation polymers.

Broadly stated, the new esters of our invention have the formula:

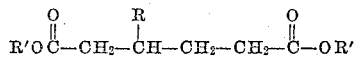

where R is a mixture of $C_3$ to $C_9$ alkyl groups, being predominantly $C_4$ and R' is a straight-chain alkyl group containing from 2 to 10 carbon atoms.

These esters may be prepared by a process comprising the following steps:

(a) Preparation of an alkyl aromatic hydrocarbon mixture by the alkylation of an aromatic hydrocarbon with an olefin mixture such as ethylene, propylene, and mixtures thereof;
(b) Sulfonation of the alkyl aromatic hydrocarbon mixture to yield a mixture of alkyl aromatic sulfonic acids;
(c) Fusion, with caustic, of the alkyl aromatic sulfonic acids to form sodium alkyl phenoxides;
(d) Acidification of the sodium alkyl phenoxides to yield a mixture of alkyl phenols;
(e) Hydrogenation of the mixture of alkyl phenols to produce a mixture of alkylcyclohexanols;
(f) Oxidation of the mixture of alkyl cyclohexanols to yield a mixture of β-alkyl adipic acids;
(g) Esterification of the β-alkyl adipic acid mixture with a straight-chain alcohol containing from 2 to 10 carbon atoms.

The olefin mixtures that may be used in preparing the alkyl aromatic hydrocarbon mixtures suitable as starting materials for the new esters of our invention are the olefin mixtures having component olefins with from 4 to about 21 carbon atoms resulting from the polymerization of ethylene, propylene, and mixtures thereof in the presence of polymerization catalysts by processes known in the art. These products from the polymerization of low-molecular weight olefins and mixtures thereof may be fractionally distilled to give fractions of olefins suitable for preparing the alkyl aromatic hydrocarbon starting materials. Thus, for example, the polymerization product may be fractionated as follows:

| Fraction | Boiling point | Average component |
|---|---|---|
| I | 50–70° C | Hexene. |
| II | 120–155° C | Nonene. |
| III | 180–248° C | Dodecene. |
| IV | 120–150° C./14 mm | Pentadecene. |
| V | 170–200° C./15 mm | Octadecene. |

The olefin fractions given in the above table are only examples of fractions that may be used to prepare the alkyl aromatic hydrocarbons starting materials. Fractions of intermediate boiling ranges or any combination of fractions and boiling ranges may be used to obtain suitable olefin mixtures.

Other suitable olefin mixtures may be obtained by the dehydrogenation of suitable paraffinic petroleum fractions. Still other suitable olefin mixtures may be obtained by the dehydration of alcohol mixtures obtained by the reaction of carbon monoxide and hydrogen in the presence of a catalyst.

The aromatic hydrocarbon that may be used in preparing the alkyl aromatic hydrocarbon mixtures suitable as starting materials for the preparation of the new esters of our invention include benzene, toluene, and the various xylenes and cumenes.

An example of an alkyl aromatic hydrocarbon mixture suitable for use in the preparation of the new esters of our invention is a product known as "Neolene 400." Neolene 400 is prepared by the catalytic alkylation of benzene with dodecene, a product of the polymerization of propylene. Characteristics of Neolene 400 are as follows.

| | |
|---|---|
| Specific gravity at 16° C | 0.8742 |
| Average molecular weight | 232 |
| A.S.T.M. distillation (D–158 Engler): | |
| I.B.P. | ° F__ 535 |
| 5 | ° F__ 545 |
| 10 | ° F__ 550 |
| 50 | ° F__ 560 |
| 90 | ° F__ 580 |
| 97 | ° F__ 592 |
| F.B.P. | ° F__ 603 |
| Refractive index at 20° C | 1.4885 |
| Viscosity at 20° C | centipoises__ 14 |
| Bromine number | 0.16 |

A preferred alkyl aromatic hydrocarbon mixture suitable for use in the preparation of the new esters of our invention is an alkylbenzene hydrocarbon mixture such as obtained as a by-product of the manufacture of dodecylbenzene. Typical characteristics of this alkylbenzene hydrocarbon mixture, which is often referred to as dodecylbenzene intermediate, are:

| | |
|---|---|
| Percent aromatic hydrocarbons | 55 |
| Molecular weight— | |
| Total | 157 |
| Aromatics | 149 |
| Paraffins | 163 |
| A.P.I. gravity at 60° F | 41.2 |
| Aniline point | ° F__ 95 |
| Flash point (closed cup) | ° F__ 129.5 |
| A.S.T.M. distillation— | |
| I.B.P. | ° F__ 290 |
| 5 | ° F__ 344 |
| 10 | ° F__ 355 |
| 50 | ° F__ 390 |
| 90 | ° F__ 438 |
| 95 | ° F__ 454 |
| F.B.P. | ° F__ 482 |

Obviously, the characteristics of the alkylbenzene hydrocarbon mixture may vary somewhat on either side of typical.

The next step in the production of our new alkyl esters is the sulfonation of the alkyl aromatic hydrocarbon mixtures described above whereby a mixture of alkyl aromatic sulfonic acids are obtained. The sulfonation of the alkyl aromatic hydrocarbon mixtures may be carried out with any suitable agent, as, for example, with various strength sulfuric acid, oleum, chlorosulfonic acid, sulfur trioxide, etc., in accordance with procedures well known in the art.

The alkyl aromatic sulfonic acid mixtures is then converted to an alkyl phenol mixture by neutralization of the sulfonic acid with caustic and fusion with potassium hydroxide at about 250 to 300° C., followed by neutralization of the reaction mass with mineral acid and isolation of the alkyl phenol mixture. An alternate method is to add the alkyl aromatic sulfonic acid mixture or its alkali salt to fused sodium hydroxide maintained at a temperature of from 340 to about 450° C., followed by neutralization of the reaction mass with mineral acid and isolation of the product alkyl phenol mixture.

Alkyl phenols prepared from dodecylbenzene intermediate contain alkyl groups which are greater than 90 percent in the para configuration and range in size from three to nine carbon atoms, tertiary butyl being one of the more common alkyl groups present. When the phenols are distilled, part of the material is solid and part is liquid. Three fractions may be used in the preparation of the acids and esters of our invention: the solids, the liquids, and the total cuts. We have found that careful selection of the phenol fraction is necessary in order to prepare esters having more desirable properties.

The alkyl phenol mixture is then converted to alkyl cyclohexanol mixture by catalytic hydrogenation in any manner known in the art. We prefer to hydrogenate the alkyl phenol mixture by treatment with hydrogen under 1,000 to 2,500 p.s.i.g., at 175 to 225° C., in the presence of Raney nickel. Other nickel, platinum, or palladium catalysts may be used.

The next step in the preparation of the new alkyl adipic esters of this invention is the oxidation of the alkyl cyclohexanol mixture to an alkyl adipic acid mixture. The art gives many processes for the oxidation of the cyclohexanols to adipic acids, most of which processes are suitable for the oxidation of the alkyl cyclohexanol mixture of this invention. Thus, nitric acid, potassium permanganate, nitrogen dioxide, or other oxidizing agents may be used. In the nitric acid oxidation process, nitric acid of from about 50 to 65 percent is preferably used, and as a catalyst from about 0.1 to about 2.0 percent by weight, based on the amount of alkyl cyclohexanol to be oxidized of a mixture of copper oxide and ammonium vanadate. Yields are improved by employing sulfuric acid in the oxidation reaction in an amount of about one mole of sulfuric acid per mole of alkyl cyclohexanol.

The final step in the preparation of the novel alkyl adipic esters of our invention is esterification of the alkyl adipic acid mixture obtained in the preceding step. The alkyl adipic acid mixture may be esterified with any monohydric alcohol whereby both of the carboxyl groups are esterified by identical alcohols, or whereby one of the carboxyls is esterified by one alcohol and the other carboxyl is esterified by a different alcohol. The alcohol may be a normal or branched-chain aliphatic, naphthenic, aromatic or heterocyclic alcohol.

In order to provide esters which are suitable for use in military turbojet aircraft, we have found that it is necessary to esterify with a straight-chain alcohol. Further, the selection of the straight-chain alcohol is somewhat critical. This will be apparent from the examples which follow.

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be construed as a limitation upon the spirit and scope of the appended claims.

EXAMPLE I

This example teaches the preparation of the alkyl phenol from dodecylbenzene intermediate (DBI) sulfonic acid. Four steps are involved which are as follows:

A. *Caustic fusion.*—In this step, DBI sulfonic acid is added to molten caustic in a stirred fusion pot vented through an atmospheric condenser to collect water and oil. Part of this oil comes from unsulfonated DBI in the sulfonic acid and the remainder is formed by side reactions during the fusion.

At 680° F. the reaction can be run in 5 to 7 hours with a yield of about 72 mole percent of theory based on sulfonic acid.

B. *Quenching.*—This step is necessary to dissolve the fusion mass for subsequent neutraliazion with acid. It is accomplished by pouring the molten mass into agitated quench water. Enough water must be present to effect complete solution. Since the fusion mass solidifies on cooling, the rate of solution is dependent on: (1) the size of the solid particles, (2) the degree of agitation, and (3) the temperature. Normally, solution is complete in 30 to 60 minutes at 180° F. The quenching operation, which is done in an open tank, results in some loss of water by evaporation. Part of the quench water should be made up of water distilled from the crude alkyl phenols to avoid loss of the phenolic compounds contained therein.

C. *Springing.*—The alkaline solution from the quenching operation is acidified to liberate the alkyl phenols from their sodium salts. Sulfuric acid, ranging in concentration from 50 to 100 percent, may be used. Reducing the pH of the solution to the range of 7 to 8 causes complete liberation of the phenols and these separate immediately as an oil layer on the sulfate-sulfite brine. The oil layer initially contains about 25 percent water. After standing for 8 hours at 160° F., the water content of the crude alkyl phenol drops to about 18 percent. The brine is drawn off, and the crude phenols are then ready for fractionation.

D. *Fractionation.*—The initial step in the fractionation is the removal of water. This is accomplished by heating at atmospheric pressure to a bottoms temperature of 300° F. The water distillate contains some phenols which can be recovered by recycling this water to the quenching step.

Vacuum fractionation of the water-free crude is then applied to separate the solid and liquid alkyl phenol cuts from the residuum. The degree of fractionation affects the sharpness of the cut between solid and liquid alkyl phenols.

Pressures in the fractionation may vary from 10 to 100 millimeters of Hg absolute. The maximum pot temperature may go to 600° F. Since the bottoms are solid at room temperature, they must be withdrawn while hot. If this is done at 500 to 600° F., no difficulty is experienced.

EXAMPLE II

This example teaches the hydrogenation of the DBI phenols. In this example, a solid cut alkyl phenol, prepared in accordance with the teachings of Example I, was used. The procedure was as follows:

Twenty pounds of solid cut alkyl phenols was charged to a 5-liter stirred autoclave. Fresh Raney nickel catalyst (75 grams) slurried in anhydrous methanol was charged to the autoclave. Hydrogen was introduced at room temperature up to 1,950 p.s.i. Heating was commenced, and hydrogen was absorbed beginning at 180° C. Initially, hydrogen was consumed very rapidly and was accompanied by an increase in the temperature up to 225° C. In an additional 6.5 hours with the temperature maintained between 170 and 185° C., 5,450 p.s.i. of hydrogen was taken up. Pressure was maintained at 2,000 p.s.i. At this point, a sample was removed for infrared analysis. The sample analyzed approximately 60 percent aromatic. Seventy-five grams of fresh catalyst was added and the autoclave temperature controlled at 165 to 185° C. for 8.5 hours, during which time 5,750 p.s.i. of hydrogen was consumed. The hydrogen pressure was kept at 3,000 to 3,500 p.s.i. overnight. Infrared examination showed approximately 8 percent aromatic present. Hydrogen was introduced again and the temperature held between 170 and 190° C. for 5.5 hours. During this period, 1,840 p.s.i. of hydrogen was taken up. Hydrogen pressure was held at 4,000 p.s.i. Infrared examination at this stage indicated only 2 to 3 percent aromatic content and no hydrocarbon. The charge was removed, filtered through Hy-Flo to remove the catalyst, and weighed. The filtered water-white product weighed 9,247 grams (20.4 pounds).

EXAMPLE III

In this example, a one-gallon portion of the alkylcyclohexanols prepared in Example II was fractionated to obtain cuts for use in oxidation and esterification. Cuts 2, 3, 4, and 5 were solid and constituted 39.14 weight percent of the total sample. The liquid portions including the forecut made up 51.46 weight percent of the sample. The remaining 9.40 weight percent constituted bottoms and non-recoverables. The complete data on the fractionation of this sample of alkylcyclohexanols are shown in Table I.

Solid alkyl adipic acids were obtained from cuts 2, 3, 4, 5, and 6 on oxidation. Liquid acids were obtained from the other cuts. Data obtained on the acids indicated that 54 percent tertiary butyl adipic acid could be obtained from the entire solid DBI phenol fraction.

*Table I*

FRACTIONATION OF ALKYLCYCLOHEXANOLS FROM SOLID PHENOLS

Total sample charge: 3,500 ml.
Operating pressure: 20 mm. Hg
Distillation conditions: 10 percent by volume cuts

| Cut No. | Head temperature, ° C. | Bottoms temperature, ° C. | Volume, ml. | Additive volume, ml. | Weight, grams | Physical state |
|---|---|---|---|---|---|---|
| 1 | 66–115 | 134–136 | 210 | 210 | 188.9 | Liquid. |
| 2 | 116–118 | 136–144 | 350 | 560 | 313.2 | Solid. |
| 3 | 119–121 | 144–146 | 350 | 1,110 | 308.6 | Do. |
| 4 | 121–123 | 146–148 | 350 | 1,460 | 312.4 | Do. |
| 5 | 123–129 | 148–165 | 350 | 1,810 | 309.3 | Do. |
| 6 | 129–136 | 165–167 | 350 | 2,360 | 310.5 | Liquid. |
| 7 | 136–140 | 167–171 | 350 | 2,710 | 322.2 | Do. |
| 8 | 140–145 | 171–173 | 375 | 3,085 | 347.8 | Do. |
| 9 | 145–153 | 173–177 | 325 | 3,410 | 299.1 | Do. |
| 10 | 153–162 | 177–207 | 175 | 3,435 | 166.4 | Do. |
| Bottoms | | | | | 104.3 | |
| Trap liquid | | | | | 95.9 | |
| Holdup in column | | | | | 98.4 | |
| | | | | | 3,177.0 | |

Solid portion, weight percent of total sample: 39.14
Liquid portion, weight percent of total sample: 51.46

EXAMPLE IV

In this example, cuts 2 and 3 of the fractionated alkylcyclohexanols of Example III were oxidized to the β-alkyl adipic acid. The procedure was as follows:

To a 3-necked flask fitted with a reflux condenser, thermometer, stirrer, and dropping funnel was charged 1,710 milliliters of 1.3 specific gravity nitric acid solution and 5 grams each of cupric nitrate and ammonium vanadate. This mixture was heated to 65° C., and then from the dropping funnel was added dropwise 618 grams of the cyclohexanols from cuts 2 and 3 (cuts 2 and 3 were solid at room temperature but melted easily to allow use of the dropping funnel). The temperature was kept at +65° C. by controlling the rate of addition of the cyclohexanols and using an external ice bath. After standing overnight, the product layer had not solidified. The reaction mixture was heated to 65° C. for one hour to flush out nitrogen oxides, and then the mixture was cooled rapidly to 5° C. Crystals formed and were filtered from the spent nitric acid solution. The spent acid weighed 1,860 grams with a specific gravity of 1.165. The weight of the crystals was 441 grams after washing with two liters of water, finally with 500 milliliters of pentane, and then drying. The acidity of the solid product was 9.92 milliequivalents per gram (meq./g.). This indicates a molecular weight of 202 which is the molecular weight of tertiary butyl adipic acid.

EXAMPLE V

Using the procedure of Example IV, cut 4 of the fractionated alkylcyclohexanols was oxidized. A yield was obtained of 260 grams of product having an acidity of 9.84 meq./g. This indicates a molecular weight of 203.

EXAMPLE VI

Using the procedure of Example IV, cut 5 of the fractioned alkylcyclohexanols was oxidized. A yield was obtained of 235 grams of product having an acidity of 9.76 meq./g., indicating a molecular weight of 205.

EXAMPLE VII

In this example, the alkyl adipic acid from cuts 2 and 3, Example IV, was esterified with equal molar portions of 1-pentanol and 1-decanol. The procedure was as follows:

To a 1-liter, 3-necked flask fitted with a reflux condenser, Dean-Stark water trap, stirrer, and thermometer were charged with 101 grams (0.5 mole) of combined cuts 2 and 3, 200 cc. of benzene, 66 grams (0.75 mole) 1-pentanol, 119 grams (0.75 mole) 1-decanol, and 2 grams of sodium bisulfate catalyst. In 5 hours at reflux, 16 milliliters of water was removed. The crude ester was washed only with water (5 x 250 milliliter portions), stripped of benzene on a water aspirator, and vacuum distilled. The following fractions were taken.

| Fraction | Pot temperature, ° C. | Vapor temperature, ° C. | Pressure, mm. Hg | Weight, grams |
|---|---|---|---|---|
| 1 | 140–191 | 116–177 | 1 | 75 |
| 2 | 191–230 | 164–207 | 0.4 | 168 |
| Bottoms | | | | 4.5 |

Fraction No. 2 was filtered 3 times through 75-gram portions of alumina in order to reduce the acid number to below one. Physical data are given in Table II. To provide a basis for comparison, the viscosity specifications for military specification Mil–L–7808–C are shown in Table III.

EXAMPLE VIII

In this example, the alkyl adipic acid from cut No. 5, Example VI, was esterified with equal molar portions of 1-pentanol and 1-decanol. The procedure was similar to that of Example VII. Physical data are given in Table II.

*Table II*

VISCOSITY PROPERTIES OF DBI ESTERS FROM FRACTIONATED ALKYLCYCLOHEXANOLS

| Example No. | Viscosity, centistokes | | | | V.I. |
|---|---|---|---|---|---|
| | −65° F. | −40° F. | 100° F. | 210° F. | |
| VII | 11,840 | 1,800 | 14.80 | 3.17 | 123 |
| VIII | 12,420 | 1,790 | 12.06 | 3.06 | 128 |

*Table III*

MIL–L–7808–C SPECIFICATIONS (IN PART)

Centistokes
Viscosity, at −65° F., maximum _____ 13,000
Viscosity, at 100° F., maximum _____ 11.0
Viscosity, at 210° F., minimum _____ 3.0

EXAMPLE IX

In this example, a sample of alkylcyclohexanols, derived from the solid alkyl phenol fraction, was oxidized to β-alkyl adipic acids. The procedure was similar to that of Example IV. The charge stocks were 1,000 grams of the alkylcyclohexanol, 3,486 grams of 1.29 specific gravity nitric acid, and 10 grams each of cupric nitrate and ammonium vanadate. The spent acid weighed 2,915 grams and had a specific gravity of 1.16. The crude product weighed 1,155 grams. It was washed with water and dissovled in a quantity of benzene. This solution weighed 1,712 grams and had an acidity of 4.15 meq./g. which corresponds to 7.1 equivalents of acid based on t-butyl adipic acid.

EXAMPLE X

In this example, a sample of alkylcyclohexanols, derived from the total alkyl phenol fraction, was oxidized to β-alkyl adipic acids. The procedure was as follows:

One thousand grams of alkylcyclohexanols, from total phenols, were added dropwise to 3,473 grams of 1.29 specific gravity nitric acid which was contained in a 3-necked, 5-liter flask fitted with a reflux condenser, thermometer, stirrer, and dropping funnel. The temperature was held at 65° C. by means of an ice bath and controlling the rate of addition of the alkylcyclohexanols. After the addition of the alkylcyclohexanols was completed, the reaction mixture was allowed to digest for 0.5 hour. The reaction mixture was cooled to room temperature and transferred to a separatory funnel where the spent nitric acid layer (2,778 grams, specific gravity 1.175) was removed. The crude acid was washed with 2 x 500 milliliter portions of water. Then benzene was added and the acids washed with 5 x 5,000 milliliters of water. After washing the benzene solution and drying over magnesium sulfate, it weighed 1,854 grams and had an acidity of 4.43 meq./g. This represents about 8.2 equivalents of acid based on t-butyl adipic acid.

EXAMPLE XI

The n-butyl-n-octyl ester was prepared of the β-alkyl adipic acids prepared in Example IX. The procedure was as follows:

The benzene solution of alkyl adipic acids (480 grams) (2 equivalents) was charged to a 3-necked, 2-liter flask fitted with a reflux condenser, Dean-Stark water trap, thermometer, and stirrer. This mixture was refluxed for 30 minutes during which time 3 milliliters of water was collected. Then 111 grams of 1-butanol, 195 grams of 1-octanol, and 2 grams of sodium bisulfate were added. After 2 hours, 23 milliliters of water was removed. Two grams of concentrated sulfuric acid was added. After six additional hours at reflux, a total of 37.5 milliliters of water was removed. The reaction mixture was washed with 2 x 100 milliliter portions of a 5 percent sodium carbonate and finally with 3 x 100 milliliter portions of water. The washed crude esters were stripped of benzene at 25 mm. Hg up to 100° C. and then vacuum distilled. The excess alcohols (169.6 grams) were removed at one mm. Hg up to 125° C. vapor temperature. The mixed esters distilled between 125–210° C. vapor temperature at 0.8 mm. Hg and weighed 370 grams. The mixture of esters filtered through 90 grams of alumina weighed 286.5 grams without washing the alumina with pentane. The acid number of the filtrate was 0.38. Physical data on these esters are given in Table IV.

EXAMPLE XII

Using the procedure of Example XI, additional esters were prepared from β-alkyl adipic acids, which had been derived from other samples of solid phenols and from the total phenol sample. The physical properties of these esters are shown in Table IV.

Table IV

PROPERTIES OF ESTERS OF β-ALKYL ADIPIC ACIDS DERIVED FROM ALKYL PHENOLS

| Ester | Phenol fraction | Pour point, ° F. | Viscosities, centistokes | | | | V.I. |
|---|---|---|---|---|---|---|---|
| | | | −65° F. | −40° F. | 100° F. | 210° F. | |
| n-Butyl-n-octyl | Solid | −74, fluid | 11,374 | 1,566 | 10.13 | 2.64 | 106 |
| n-Propyl-n-decyl | do | −75, fluid | 15,980 | 2,150 | 12.26 | 3.07 | 124 |
| n-Butyl-n-decyl | do | −70, fluid | 13,770 | 2,000 | 12.10 | 3.04 | 123 |
| n-Amyl-n-decyl | do | do | 16,470 | 2,150 | 12.92 | 3.20 | 129 |
| Di-n-hexyl | Total | | 15,080 | 1,840 | 10.38 | 2.67 | 104 |
| n-Propyl-n-decyl | do | | 22,890 | 2,770 | 13.78 | 3.17 | 115 |
| n-Amyl-n-octyl | do | −74, fluid | 18,476 | 2,274 | 11.48 | 2.86 | 108 |
| n-Butyl-n-decyl | do | do | 19,705 | 2,668 | 13.30 | 3.23 | 126 |

In summary, we have shown a method for preparing new and useful compositions of matter from a material which heretofore had little commercial value. In addition, we have shown that careful selection of the alkylcyclohexanol fractions in conjunction with a careful selection of esterifying alcohols results in a mixture of diesters which may be used in military turbojet aircraft.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. In a process for preparing esters of beta-alkyl substituted adipic acids wherein the alkyl group is predominantly tertiary butyl, said esters having pour points of at least about −70° F., viscosity indices of at least about 120, and being suitable for use as synthetic lubricants, from alkylbenzene hydrocarbon mixture, said alkylbenzene hydrocarbon mixture having substantially the following properties.

Percent aromatic hydrocarbons _____ 55
Molecular weight:
    Total _____ 157
    Aromatics _____ 149
    Paraffins _____ 163
A.P.I. gravity at 60° F _____ 41.2
Aniline point _____ ° F__ 95
A.S.T.M. distillation:
    I.B.P. _____ ° F__ 290
    5 _____ ° F__ 344
    10 _____ ° F__ 355
    50 _____ ° F__ 390
    90 _____ ° F__ 438
    95 _____ ° F__ 454
    F.B.P. _____ ° F__ 482 by the steps of sulfonation to form alkylbenzene sulfonic acids, caustic fusion of the alkylbenzene sulfonic acids to form sodium alkyl phenoxide, acidification of the sodium alkyl phenoxide to form alkyl phenols, hydrogenation of the alkyl phenols to form alkylcyclohexanols, oxidation of the alkylcyclohexanols to form beta-alkyl substituted adipic acids, and esterification to form esters of beta-alkyl substituted adipic acids, the improvement comprising separation of said mixture of alkyl phenols into a solid fraction and a liquid fraction, hydrogenation of said solid fraction of alkyl phenols to produce a mixture of alkylcyclohexanols, fractionation of said mixture of alkylcyclohexanols to recover a fraction comprising a major proportion of p-tertiary butyl cyclohexanol, oxidation of said fraction comprising a major proportion of p-tertiary butyl cyclohexanol to a mixture of beta-alkyl substituted adipic acids, wherein the alkyl group is predominantely tertiary butyl, and esterification of said mixture of beta-alkyl substituted adipic acids with equimolar portions of a normal alkanol containing from 3 to 5 carbon atoms and a normal alkanol containing from 8 to 10 carbon atoms.

2. The process of claim 1 wherein the alkanols used in the esterification step are n-propyl and n-decyl.

3. The process of claim 1 wherein the alkanols used in the esterification step are n-butyl and n-decyl.

4. The process of claim 1 wherein the alkanols used in the esterification step are n-amyl and n-decyl.

References Cited in the file of this patent

UNITED STATES PATENTS

| | | |
|---|---|---|
| 1,643,619 | Claasen | Sept. 27, 1927 |
| 2,548,493 | Robey | Apr. 10, 1951 |
| 2,822,406 | Feighner | Feb. 4, 1958 |

OTHER REFERENCES

Pines et al.: J. Am. Chem. Soc. 61, 2728–2730 (1939).
Bried et al.; Ind. Eng. Chem. 39, 484–491 (1947).
McTurk: "Synthetic Lubricants," WADC Technical Report, 53–58, October 1953, pages 1–10 and 17.